(12) United States Patent
Yuan

(10) Patent No.: US 8,694,283 B2
(45) Date of Patent: Apr. 8, 2014

(54) SYSTEM AND METHOD FOR MODELING CONDITIONAL DEPENDENCE FOR ANOMALY DETECTION IN MACHINE CONDITION MONITORING

(75) Inventor: Chao Yuan, Plainsboro, NJ (US)

(73) Assignee: Siemens Aktiengesellschaft, München (DE)

( * ) Notice: Subject to any disclaimer, the term of this patent is extended or adjusted under 35 U.S.C. 154(b) by 350 days.

(21) Appl. No.: 13/186,538

(22) Filed: Jul. 20, 2011

(65) Prior Publication Data

US 2012/0072173 A1 Mar. 22, 2012

Related U.S. Application Data

(60) Provisional application No. 61/383,767, filed on Sep. 17, 2010.

(51) Int. Cl.
*G06F 17/18* (2006.01)
*G05B 17/02* (2006.01)
(52) U.S. Cl.
CPC ..................................... *G05B 17/02* (2013.01)
USPC .......................................................... 702/181
(58) Field of Classification Search
CPC .......................................................... G05B 17/02
USPC .......................................................... 702/181
See application file for complete search history.

(56) References Cited

U.S. PATENT DOCUMENTS

| | | |
|---|---|---|
| 2002/0066054 A1 | 5/2002 | Jaw et al. |
| 2006/0184462 A1* | 8/2006 | Hawkins ........................ 706/14 |
| 2008/0300879 A1 | 12/2008 | Bouchard et al. |

OTHER PUBLICATIONS

Varun Chandola, et al., "Anomaly Detection: A Survey," ACM Computing Surveys, Sep. 2009, pp. 1-72.
Junshui Ma, et al., "Online Novelty Detection on Temporal Sequences," SIGKDD 2003, Aug. 24-27, 2003.
Isermann et al., "Model-based fault-detection and diagnosis—status and applications", Annual Reviews in Control, Pergamon, Amsterdamn, NL, vol. 29, No. 1, Jan. 1, 2005, pp. 71-85.
European Search Report dated Apr. 24, 2012.

* cited by examiner

*Primary Examiner* — Bryan Bui
(74) *Attorney, Agent, or Firm* — Michele L. Conover

(57) ABSTRACT

A method for predicting sensor output values of a machine sensor monitoring system includes providing a set of input sensor data X and a set of output sensor data Y for a plurality of sensors the monitor the performance of a machine, learning a functional relationship that maps the input sensor data to the output sensor data by maximizing a logarithm of a marginalized conditional probability function P(Y|X) where a dependence of the output sensor data Y with respect to unknown hidden machine inputs u has been marginalized, providing another set of input sensor data X', and calculating expected values of the output sensor data Y' using the input sensor data X' and the marginalized conditional probability function P(Y|X'), where the calculated expectation values reflect the dependence of the output sensor data Y" with respect to the unknown hidden machine inputs u.

21 Claims, 3 Drawing Sheets

SYSTEM AND METHOD FOR MODELING CONDITIONAL DEPENDENCE FOR ANOMALY DETECTION IN MACHINE CONDITION MONITORING

CROSS REFERENCE TO RELATED UNITED STATES APPLICATIONS

This application claims priority from "Modeling Conditional Dependence for Anomaly Detection in Machine Condition Monitoring", U.S. Provisional Application No. 61/383,767 of Chao Yuan, filed Sep. 17, 2010, the contents of which are herein incorporated by reference in their entirety.

TECHNICAL FIELD

This disclosure is directed to methods for monitoring the condition of a machine based on sensor output.

DISCUSSION OF THE RELATED ART

The task of machine condition monitoring is to detect machine anomalies and faults as early as possible to avoid further damages to the machine. This may be accomplished by analyzing the data of a set of sensors, installed on different parts of a machine, and measuring indicators such as temperature, pressure, vibration, etc. When a machine is operating normally, all sensors obey certain relationships. During monitoring, violation of such relationships or dependencies may indicate a fault.

Such a relationship of sensor values can be expressed mathematically in the form of probability $P(x)$, where x is a vector of all sensor values at a data point. If $P(x) >$ a threshold T, the machine is operating normally, otherwise, an anomaly has been detected. This is the fundamental idea behind many prior art monitoring techniques. The sensors may be classified into two categories. A vector x can represent sensor values of inputs to the machine, such as gas flow, inlet temperature. A vector y can represent sensor values of outputs of the machine's operation, such as various temperature, pressure, vibration sensor values.

A typical monitoring model based on this conditional probability is as follows:

$$y = f(x) + e. \qquad (1)$$

In EQ. (1), $y = [y_1, y_2, \ldots, y_M]^T$ is an M-dimensional vector and $x = [x_1, x_2, \ldots, x_N]^T$ is an N-dimensional vector. $f(x) = [f_1(x), f_2(x), \ldots f_M(x)]^T$ is a function vector with each $f_m(x)$ being a function of all input values to predict one output value $y_m$. $e = [e_1, e_2, \ldots, e_M]^T$ is another M-dimensional vector representing the modeling error. e is assumed to have a Gaussian distribution with zero mean and diagonal covariance matrix: $P(e) = N(e|0, \sigma^2 I_m)$, where $I_M$ is a M×M identity matrix and $\sigma^2$ is the variance. In such a formulation, the $e_m$, are all independent of each other. Thus, given EQ. (1), $P(y|x)$ has a Gaussian distribution:

$$P(y|x) = N(y|f(x), \sigma^2 I_M). \qquad (2)$$

There are at least two methods of applying EQ. (1) to anomaly detection. First, one can compare $P(y|x)$ or the log likelihood of $P(y|x)$ with a threshold T. If $\ln P(y|x) > T$, the machine is operating normal otherwise, there is an anomaly. Second, the deviation of $y_m$ from $f_m(x)$, or $y_m - f_m(x)$ is calculated. If the deviation $> S$, another fixed threshold, there is an anomaly, because $y_m$ is too different from its mean value $f_m(x)$. Note that Ref.[5] is a contextual anomaly detection approach.

The assumption of conditionally independence of $y_1, y_2, \ldots, y_M$ given x, as expressed in EQ. (2), presents challenges. If $y_1$ and $y_2$ are purely determined by x, it is valid to assume $y_1$ and $y_2$ are conditionally independent given x. However, once there is some unknown variable (vector) u, $y_1$ and $y_2$ are dependent to each other. This happens frequently in machine condition monitoring applications, because many system inputs, such as gas quality and air concentration levels, are not measured by any sensors. The hidden variable u represents such missing information. Only when all information, both x and u, is given, can one say that $y_1$ and $y_2$ are independent:

$$P(y_1, y_2 | x, u) = P(y_2 | x, u) P(y_2 | x, u).$$

Therefore, EQ. (2) should be modified to address the conditional dependence of y given x.

FIG. 1 graphically illustrates conditional dependence in a simple case where M=2, that of $y_1$ and $y_2$ on x and u, where x is known and u is an unknown hidden vector. Each of $y_1$ and $y_2$ depends on both x and u.

SUMMARY OF THE INVENTION

Exemplary embodiments of the invention as described herein generally include methods and systems for modeling the conditional dependence of output sensor values given the input sensor values by marginalizing over the hidden input values. According to an embodiment of the invention, the conditional probability of $P(y|x)$ is used for anomaly detection, also referred to as contextual anomaly detection, in which $\ln P(y|x)$ is compared with T. For detecting anomalies of a machine system, according to an embodiment of the invention, it is assumed that there are some unknown hidden input values that are also needed to determine the outputs. If all known input values and hidden input values are given, the output values can be viewed as conditionally independent. Otherwise, more realistically, the output values are conditionally dependent. According to an embodiment of the invention, a linear model with analytic solutions is presented. Test results demonstrate the usefulness of an algorithm according to an embodiment of the invention.

According to an aspect of the invention, there is provided a method for predicting sensor output values of a machine sensor monitoring system, the method including providing a set of input sensor data X and a set of output sensor data Y for a plurality of sensors the monitor the performance of a machine, learning a functional relationship that maps the input sensor data to the output sensor data by maximizing a logarithm of a marginalized conditional probability function $P(Y|X)$ where a dependence of the output sensor data Y with respect to unknown hidden machine inputs u has been marginalized, providing another set of input sensor data X', and calculating expected values of the output sensor data Y' using the input sensor data X' and the marginalized conditional probability function $P(Y|X)$, where the calculated expectation values reflect the dependence of the output sensor data Y' with respect to the unknown hidden machine inputs u.

According to a further aspect of the invention, the functional relationship that maps the input sensor data to the output sensor data is $y = f(x, u) = Ax + Bu$, where x and y are vectors of the input sensor data X and the output sensor data Y, respectively, u is a vector representing unknown hidden input values, and A and B are matrix parameters of the model.

According to a further aspect of the invention, a conditional probability of y given x for the functional relationship $f(x, u) = Ax + Bu$ is $P(y|x) = N(y|Ax, BB^T + \sigma^2 I_M)$, and learning the functional relationship $f(x, u) = Ax + Bu$ comprises estimating A from $A = (YX^T)(XX^T)^{-1}$, estimating B from the first K eigenvectors of $(Y-AX)(Y-AX)^T/L$, and calculating $\sigma^2$ from an average variance of the remaining L-K minor components of $(Y-AX)(Y-AX)^T/L$.

According to a further aspect of the invention, the logarithm of the marginalized conditional probability function $P(Y|X)$ is maximized using a gradient descent optimization.

According to a further aspect of the invention, the logarithm of the marginalized conditional probability function $P(Y|X)$ is maximized using a an expectation-maximization algorithm.

According to a further aspect of the invention, a gradient descent optimization is used at each iteration of the expectation-maximization algorithm.

According to a further aspect of the invention, the functional relationship that maps the input sensor data to the output sensor data is $y=f(x, u)+e$, where $f(x, u)$ is parameterized by a vector $\theta$, $y$ is an M-dimensional vector that represents the output sensor data values $y$, $x$ is an N-dimensional vector that represents the input sensor data values $x$ and $u$ is a K-dimensional vector that represents the unknown hidden machine inputs, and $e$ is an M-dimensional vector that represents a modeling error that has a Gaussian distribution $P(e)=N(e|0, \sigma^2 I_M)$ with 0 mean and standard deviation $\sigma^2 I_M$ where $I_M$ is an M×M identity matrix.

According to a further aspect of the invention, the marginalized conditional probability function $P(Y|X)$ is computed by integrating $P(y|x)=\int_u P(y|x,u)P(u)du$, where $P(y|x, u)=N(y|f(x, u), \sigma^2 I_M)$ is a conditional probability of the output sensor data values $y$ given the input sensor data values $x$ and the unknown hidden machine inputs $u$, $N$ is a Gaussian distribution whose mean value is given by $f(x, u)$ and standard deviation is given by $\sigma^2 I_M$ where $I_M$ is an M×M identity matrix, and $P(u)=N(u|0, I_K)$ is a Gaussian probability distribution for $u$ of 0 mean and standard deviation $I_K$, where $I_K$ is a K×K identity matrix.

According to a further aspect of the invention, K is determined by cross validation.

According to another aspect of the invention, there is provided a program storage device readable by a computer, tangibly embodying a program of instructions executable by the computer to perform the method steps for predicting sensor output values of a machine sensor monitoring system.

DETAILED DESCRIPTION OF EXEMPLARY EMBODIMENTS

Figure 1:
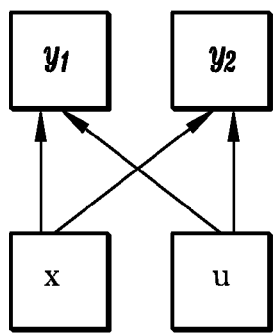
FIG. 1 graphically illustrates the conditional dependence of $y_1$ and $y_2$ given x, according to an embodiment of the invention.

Exemplary embodiments of the invention as described herein generally include systems and methods for modeling the conditional dependence of output sensor values given the input sensor values by marginalizing over the hidden input values. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Models

According to an embodiment of the invention, following model can address the conditional dependence of $y_1, y_2, \ldots, y_M$:

$$y=f(x,u)+e, \quad (3)$$

where the function $f(x, u)$ is parameterized by a parameter vector $\theta$, and the error term e represents the effects of noise in the measurements. In the case where f is represented using radial basis functions, $\theta$ may represent a kernel width and a coefficient for each kernel. The K-dimensional vector $u=[u_1, u_2, \ldots, u_K]^T$ represents the hidden vector in FIG. 1. According to an embodiment of the invention, it is assumed that u has a fixed Gaussian distribution:

$$P(u)=N(u|0,I_K) \quad (4)$$

Parameters of u, if there are any, will be carried by function f. According to an embodiment of the invention, it may be assumed that K is known. According to other embodiments of the invention, K can be learned by cross validation. The error e also has a fixed Gaussian distribution $P(e)=N(e|0, \sigma^2 I_M)$, and represents the same modeling error as in EQ. (1). EQ. (3) has the following conditional probability:

$$P(y|x,u)=N(y|f(x,u),\sigma^2 I_M). \quad (5)$$

EQ. (5) indicates that $y_1, y_2, \ldots, y_M$ are independent if both x and u are given. However, in reality, u is unknown, so one marginalizes over u:

$$P(y|x) = \int_u P(y|x, u)P(u)du. \quad (6)$$

A model according to an embodiment of the invention may be defined by EQS. (3), (4), (5) and (6).

During a training stage, given a set of training data $X=[x_1, x_2, \ldots, x_L]$ and $Y=[y_1, y_2, \ldots y_L]$, the parameter $\theta$ for $f(x, u)$ and the variance $\sigma^2$ for EQ. (5) will be learned. Note that there is no u available for training. According to an embodiment of the invention, the training may be accomplished by maximizing the log likelihood of training to data:

$$\underset{\theta,\sigma^2}{\text{Max}} ln P(y|x). \quad (7)$$

For future test data, if $\ln P(y|x)>T$, the machine is operating normally; otherwise, there is an anomaly. Because EQ. (6) generally does not have an analytic form, maximizing EQ. (7) involves iterations. According to embodiments of the invention, there are at least three ways of solving EQ. (7). A first method according to an embodiment of the invention uses a standard gradient descent optimization method. A second method according to an embodiment of the invention uses an Expectation-Maximization (EM) algorithm. A third method according to an embodiment of the invention combines a gradient descent within the EM iteration loops.

According to an embodiment of the invention, a linear model for $f(x, u)$ has the form of $$f(x,u)=Ax+Bu \quad (8)$$

where matrices A and B are the parameters of function f, i.e., θ={A, B}. In this case, EQ. (6), the conditional probability of y given x, has a Gaussian distribution and thus an analytic form:

$$P(y|x)=N(y|Ax, BB^T+\sigma^2 I_M). \quad (9)$$

In a linear model according to an embodiment of the invention, EQ. (6) can be maximizes in a single pass. First, A is estimated:

$$A=(YX^T)(XX^T)^{-1}. \quad (10)$$

Once A is known, EQ. (8) reduces to a probabilistic principal component analysis model (PPCA). B corresponds to the first K eigenvectors of $(Y-AX)(Y-AX)^T/L$. $\sigma^2$ is the average variance of the remaining L-K minor components, where L is the number of items in each of the training sets X and Y, above.

Figure 2:
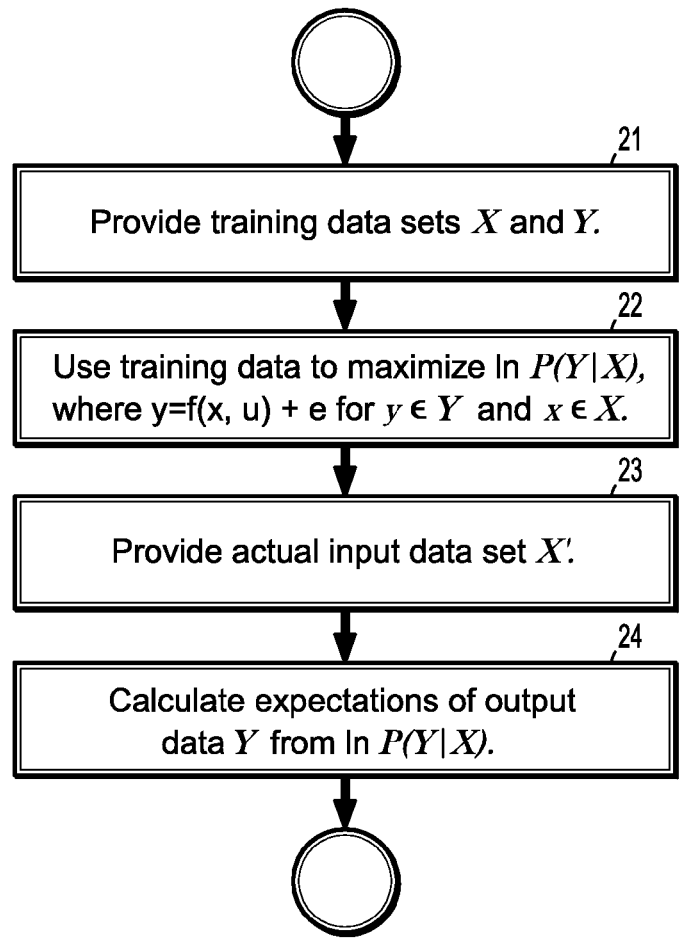
FIG. 2 is a flowchart of a method of modeling the conditional dependence of output sensor values given the input sensor values by marginalizing over the hidden input values, according to an embodiment of the invention.

FIG. 2 is a flowchart that summarizes a method of modeling the conditional dependence of output sensor values given the input sensor values by marginalizing over the hidden input values, according to an embodiment of the invention. Referring to the figures, a method according to an embodiment of the invention begins at step 21 by providing the input data and output data sets X and Y, respectively. These training data sets are used to maximize the log likelihood of the marginalized conditional probability function P(Y|X) at step 22. For a general model according to an embodiment of the invention, this maximizing may involve one of the methods discloses above, such as gradient descent or expectation-maximization. For a linear model according to an embodiment of the invention, the log likelihood of $P(y|x)=N(y|Ax, BB^T+\sigma^2 I_M)$ from EQ. (9) is maximizes by evaluating $A=(YX^T)(XX^T)$ from EQ. (10) and then solving the PPCA model for B and $\sigma^2$. At step 23, a data set X' of actual test data is provided, and this data is used at step 24 to calculate the expectations values for the output data values y from the log likelihood of $P(y|x)=N(y|Ax, BB^T+\sigma^2 I_M)$.

Test Results

Figure 3:
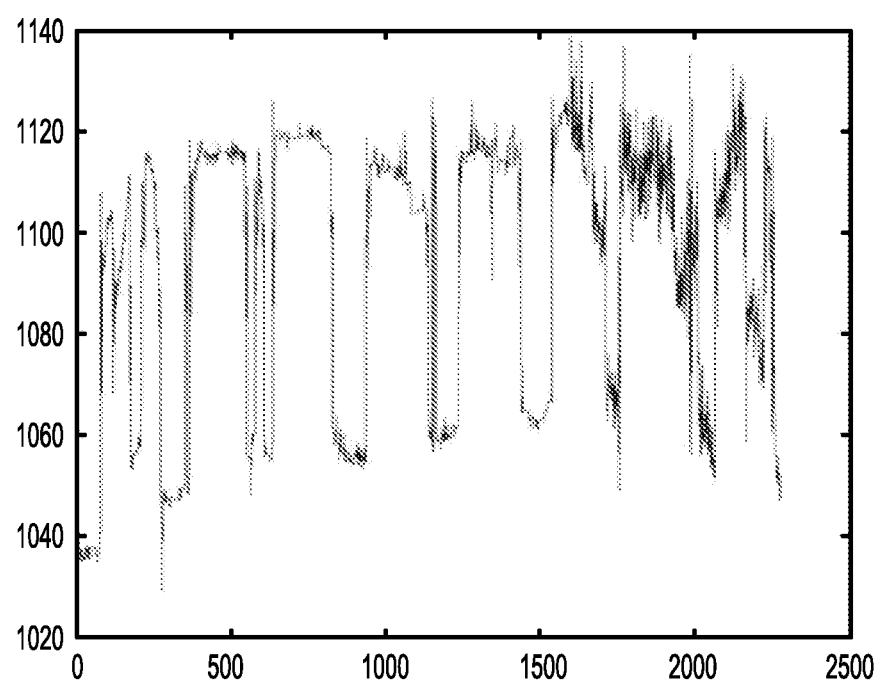
FIG. 3 is a plot of sensor values for selected input values, according to an embodiment of the invention.

Data from a gas turbine of a European combined cycle power plant was used to test an algorithm according to an embodiment of the invention. A total of 35 sensors are used. The input x includes N=3 process drivers: gas flow, inlet temperature, and an inlet guide vane (IGV) actuator position. The output y contains M=32 blade path temperature sensors: BPTC1A, BPTC1B, . . . , BPTC16A and BPTC16B. There are a total of 2279 data points, all representing normal operation of the gas turbine. FIG. 3 shows a plot of the sensor values for an output sensor BPTC1A at these 2279 data points. Each sensor value was normalized to zero mean and unit standard deviation.

L=1140 data points were randomly selected for training and the remaining 1139 data points were used for testing. According to an embodiment of the invention, a linear model was tested. K was set to 2 for this test. Using a linear model according to an embodiment of the invention, A, B and $\sigma^2$ are sequentially learned. The learned model was then applied to evaluate the test data. For each test data point i, $\ln P(y_i|x_i)$ was calculated, where P(y|x) is defined by EQ. (9). The final test score is the sum of all 1139 $\ln P(y_i|x_i)$ values. According to an embodiment of the invention, the test score is 7795. Because this data set comprises all normal data points, higher test scores imply that the data points can pass the anomaly detection test of $\ln P(y_i|x_i) > T$.

According to another embodiment of the invention, a similar model was considered without using the hidden variable u. This is equivalent to a linear model according to an embodiment of the invention, with (8) replaced by f(x)=Ax, and EQ. (9) replaced by $P(y|x)=N(y|Ax, \sigma^2 I_M)$. The test score of this model is now much lower: −9164. This demonstrates that a model according to an embodiment of the invention can model the conditional probability of y given x.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
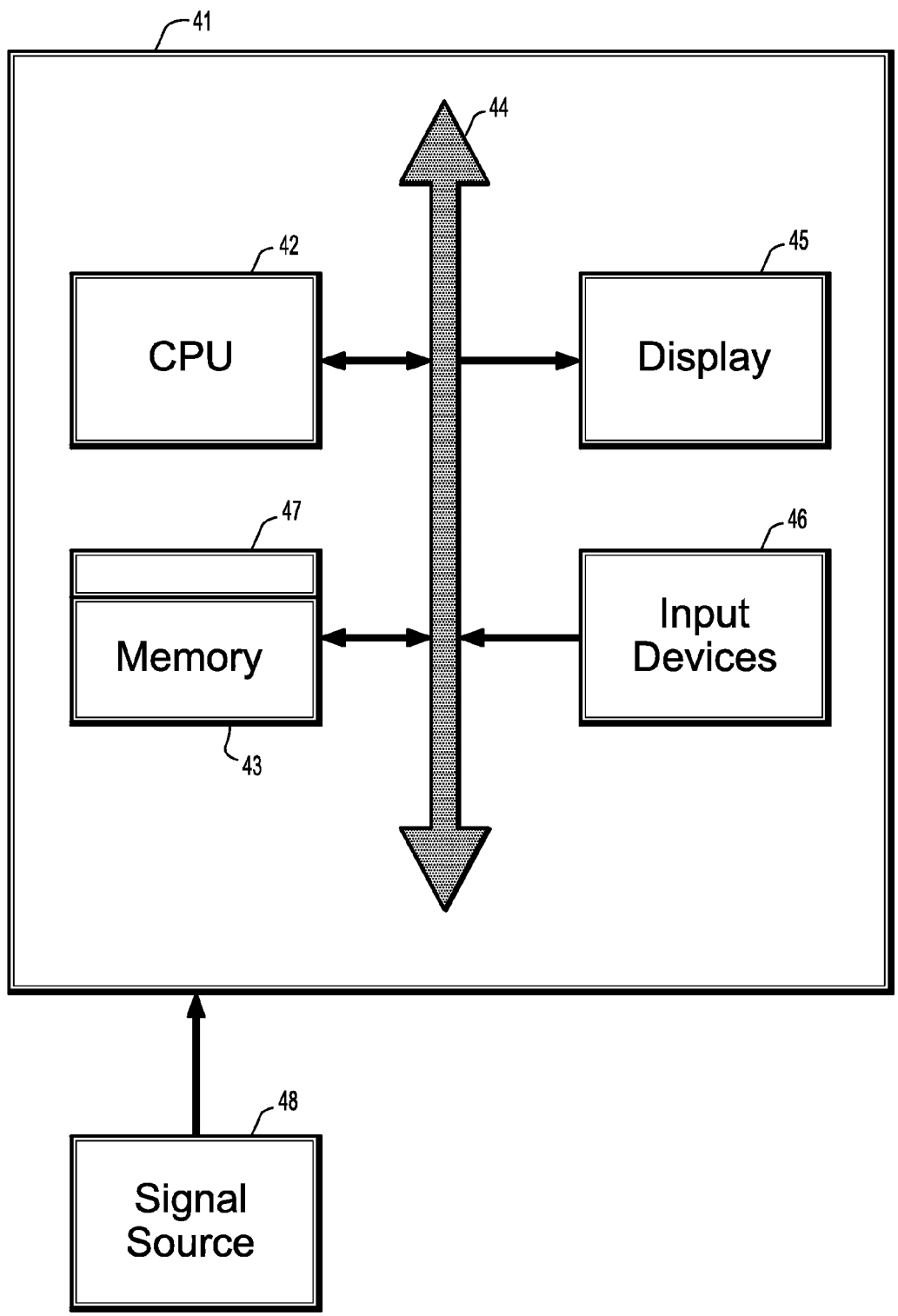
FIG. 4 is a block diagram of an exemplary computer system for implementing a method for modeling the conditional dependence of output sensor values given the input sensor values by marginalizing over the hidden input values, according to an embodiment of the invention.

FIG. 4 is a block diagram of an exemplary computer system for implementing a method for modeling the conditional dependence of output sensor values given the input sensor values by marginalizing over the hidden input values, according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A computer-implemented method of predicting sensor output values of a machine sensor monitoring system, comprising the steps of:
providing a set of input sensor data X and a set of output sensor data Y for a plurality of sensors that monitor the performance of a machine, wherein the output sensor data Y depend on the input sensor data X and on unknown hidden machine inputs u;
learning a functional relationship that maps the input sensor data to the output sensor data by maximizing a logarithm of a marginalized conditional probability function P(Y|X) wherein the dependence of the output sensor data Y with respect to unknown hidden machine inputs u has been marginalized;

providing another set of input sensor data X'; and calculating expected values of the output sensor data Y' using the input sensor data X' and the marginalized conditional probability function P(Y|X), wherein the calculated expectation values reflect the dependence of the output sensor data Y' with respect to the unknown hidden machine inputs u.

2. The method of claim 1, wherein the functional relationship that maps the input sensor data to the output sensor data is y=f(x, u)=Ax+Bu, wherein x and y are vectors of the input sensor data X and the output sensor data Y, respectively, u is a vector representing unknown hidden input values, and A and B are matrix parameters of the model.

3. The method of claim 2, wherein a conditional probability of y given x for the functional relationship f(x, u)=Ax+Bu is $P(y|x)=N(y|Ax, BB^T+\sigma^2 I_M)$, and learning the functional relationship f(x, u)=Ax+Bu comprises estimating A from $A=(YX^T)(XX^T)^{-1}$, estimating B from the first K eigenvectors of $(Y-AX)(Y-AX)^T/L$, and calculating $\sigma^2$ from an average variance of the remaining L-K minor components of $(Y-AX)(Y-AX)^T/L$.

4. The method of claim 1, wherein said logarithm of the marginalized conditional probability function P(Y|X) is maximized using a gradient descent optimization.

5. The method of claim 1, wherein said logarithm of the marginalized conditional probability function P(Y|X) is maximized using an expectation-maximization algorithm.

6. The method of claim 5, wherein a gradient descent optimization is used at each iteration of the expectation-maximization algorithm.

7. The method of claim 1, wherein the functional relationship that maps the input sensor data to the output sensor data is y=f(x, u)+e, wherein f(x, u) is parameterized by a vector θ, y is an M-dimensional vector that represents the output sensor data values y, x is an N-dimensional vector that represents the input sensor data values x and u is a K-dimensional vector that represents the unknown hidden machine inputs, and e is an M-dimensional vector that represents represents a modeling error that has a Gaussian distribution $P(e)=N(e|0, \sigma^2 I_M)$ with 0 mean and standard deviation $\sigma^2 I_M$ wherein $I_M$ is an M×M identity matrix.

8. The method of claim 7, wherein the marginalized conditional probability function P(Y|X) is computed by integrating $$P(y|x) = \int_u P(y|x, u)P(u)du,$$

wherein $P(y|x, u)=N(y|f(x, u), \sigma^2 I_M)$ is a conditional probability of the output sensor data values y given the input sensor data values x and the unknown hidden machine inputs u, N is a Gaussian distribution whose mean value is given by f(x, u) and standard deviation is given by $\sigma^2 I_m$ wherein $I_M$ is an M×M identity matrix, and $P(u)=N(u|0, I_K)$ is a Gaussian probability distribution for u of 0 mean and standard deviation $I_K$, wherein $I_K$ is a K×K identity matrix.

9. The method of claim 7, wherein K is determined by cross validation.

10. A computer-implemented method of predicting sensor output values of a machine sensor monitoring system, comprising the steps of:

providing a set of input sensor data X and a set of output sensor data Y for a plurality of sensors that monitor the performance of a machine;

providing a functional relationship y=f(x, u)=Ax+Bu that maps the input sensor data x to the output sensor data y, wherein x and y are N and M dimensional vectors of the input sensor data X and the output sensor data Y, respectively, u is a K-dimensional vector representing unknown hidden input values, and A and B are unknown matrix parameters of the functional relationship, wherein a conditional probability of y given x for the functional relationship f(x, u)=Ax+Bu is $P(y|x)=N(y|Ax, BB^T+\sigma^2 I_m)$ wherein N is a Gaussian distribution of mean Ax and standard deviation $BB^T+\sigma^2 I_M$ wherein $I_M$ is an M×M identity matrix;

estimating A from $A=(YX^T)(XX^T)^{-1}$;

estimating B from the first K eigenvectors of $(Y-AX)(Y-AX)^T/L$; and calculating $\sigma^2$ from an average variance of the remaining L-K minor components of $(Y-AX)(Y-AX)^T/L$, wherein the functional relationship f(x, u) is configured to predict the output sensor data y in terms of the input sensor data X and on unknown hidden machine inputs u.

11. The method of claim 10, further comprising:

providing another set of input sensor data X'; and calculating expected values of the output sensor data Y' using the input sensor data X' and the marginalized conditional probability function P (Y|X), wherein the calculated expectation values reflect the dependence of the output sensor data Y" with respect to the unknown hidden machine inputs u.

12. The method of claim 10, wherein the functional relationship further includes an M-dimensional vector term e that represents a modeling error that is distributed as $P(e)=N(e|0, \sigma^2 I_M)$ with 0 mean and standard deviation $\sigma^2 I_M$ wherein $I_M$ is an M×M identity matrix.

13. A non-transitory program storage device readable by a computer, tangibly embodying a program of instructions executable by the computer to perform the method steps for predicting sensor output values of a machine sensor monitoring system, the method comprising the steps of:

providing a set of input sensor data X and a set of output sensor data Y for a plurality of sensors that monitor the performance of a machine, wherein the output sensor data Y depend on the input sensor data X and on unknown hidden machine inputs u;

learning a functional relationship that maps the input sensor data to the output sensor data by maximizing a logarithm of a marginalized conditional probability function P(Y|X) wherein the dependence of the output sensor data Y with respect to unknown hidden machine inputs u has been marginalized;

providing another set of input sensor data X'; and calculating expected values of the output sensor data Y' using the input sensor data X' and the marginalized conditional probability function P(Y|X), wherein the calculated expectation values reflect the dependence of the output sensor data Y" with respect to the unknown hidden machine inputs u.

14. The computer readable program storage device of claim 13, wherein the functional relationship that maps the input sensor data to the output sensor data is y=f(x, u)=Ax+Bu, wherein x and y are vectors of the input sensor data X and the output sensor data Y, respectively, u is a vector representing unknown hidden input values, and A and B are matrix parameters of the model.

15. The computer readable program storage device of claim 14, wherein a conditional probability of y given x for the functional relationship $f(x, u)=Ax+Bu$ is $P(y|x)=N(y|Ax, BB^T+\sigma^2 I_M)$, and learning the functional relationship $f(x, u)=Ax+Bu$ comprises estimating A from $A=(YX^T)(XX^T)^{-1}$, estimating B from the first K eigenvectors of $(Y-AX)(Y-AX)^T/L$, and calculating $\sigma^2$ from an average variance of the remaining L-K minor components of $(Y-AX)(Y-AX)^T/L$.

16. The computer readable program storage device of claim 13, wherein said logarithm of the marginalized conditional probability function P(Y|X) is maximized using a gradient descent optimization.

17. The computer readable program storage device of claim 13, wherein said logarithm of the marginalized conditional probability function P(Y|X) is maximized using an expectation-maximization algorithm.

18. The computer readable program storage device of claim 17, wherein a gradient descent optimization is used at each iteration of the expectation-maximization algorithm.

19. The computer readable program storage device of claim 13, wherein the functional relationship that maps the input sensor data to the output sensor data is $y=f(x, u)+e$, wherein $f(x, u)$ is parameterized by a vector $\theta$, y is an M-dimensional vector that represents the output sensor data values y, x is an N-dimensional vector that represents the input sensor data values x and u is a K-dimensional vector that represents the unknown hidden machine inputs, and e is an M-dimensional vector that represents represents a modeling error that has a Gaussian distribution $P(e)=N(e|0, \sigma^2 I_m)$ with 0 mean and standard deviation $\sigma^2 I_m$ wherein $I_M$ is an M×M identity matrix.

20. The computer readable program storage device of claim 19, wherein the marginalized conditional probability function P(Y|X) is computed by integrating $$P(y|x) = \int_u P(y|x, u)P(u)du,$$

wherein $P(y|x, u)=N(y|f(x, u), \sigma^2 I_M)$ is a conditional probability of the output sensor data values y given the input sensor data values x and the unknown hidden machine inputs u, N is a Gaussian distribution whose mean value is given by $f(x, u)$ and standard deviation is given by $\sigma^2 I_M$ wherein $I_M$ is an M×M identity matrix, and $P(u)=N(u|0, I_K)$ is a Gaussian probability distribution for u of 0 mean and standard deviation $I_K$, wherein $I_K$ is a K×K identity matrix.

21. The computer readable program storage device of claim 19, wherein K is determined by cross validation.

* * * * *